(12) United States Patent
Zwettler et al.

(10) Patent No.: US 6,874,720 B2
(45) Date of Patent: Apr. 5, 2005

(54) DATA STORAGE TAPE CARTRIDGE WITH SUBAMBIENT PRESSURE FEATURE

(75) Inventors: Christopher J. Zwettler, Lake Elmo, MN (US); Saeed A. Fahimi, Bloomington, MN (US); Michael A. Mewes, Fargo, ND (US); Douglas W. Johnson, Stillwater, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 10/452,334

(22) Filed: Jun. 2, 2003

(65) Prior Publication Data

US 2004/0238668 A1 Dec. 2, 2004

(51) Int. Cl.[7] .............................................. G11B 23/04
(52) U.S. Cl. ..................................... 242/346; 360/132
(58) Field of Search ........................... 242/346, 346.1, 242/334; 360/96.3, 132

(56) References Cited

U.S. PATENT DOCUMENTS

| | | | |
|---|---|---|---|
| 4,093,148 A | * | 6/1978 | Urynowicz et al. |
| 5,326,044 A | * | 7/1994 | Haller ....................... 242/346.1 |
| 5,346,155 A | * | 9/1994 | Alexander et al. .......... 242/334 |
| 5,513,815 A | * | 5/1996 | Erickson et al. ............ 242/346 |
| 5,823,455 A | * | 10/1998 | Hable et al. ................. 360/132 |
| 5,893,526 A | | 4/1999 | Zwettler |
| 6,014,293 A | | 1/2000 | Casey et al. |
| 6,069,777 A | * | 5/2000 | Vanderheyden et al. .... 360/132 |
| 6,122,147 A | | 9/2000 | Fahimi et al. |
| 6,229,669 B1 | | 5/2001 | Beck et al. |
| 6,249,401 B1 | * | 6/2001 | Zwettler ...................... 360/132 |
| 6,343,757 B1 | | 2/2002 | Zwettler |
| 6,373,656 B2 | | 4/2002 | Poorman et al. |
| 6,405,957 B1 | | 6/2002 | Alexander et al. |
| 6,433,959 B1 | | 8/2002 | Lakshmikumaran et al. |
| 6,457,664 B1 | * | 10/2002 | Zwettler ...................... 360/132 |

* cited by examiner

Primary Examiner—William A. Rivera
(74) Attorney, Agent, or Firm—Eric D. Levinson

(57) ABSTRACT

A subambient pressure feature for assisting in guidance of storage tape within a tape transport system such as a data storage tape cartridge and/or a tape drive. The storage tape is extended between two tape reels along a tape path defined, in part, by a tape guide. The tape guide includes a curved tape-receiving surface defined by an entrance side and an exit side. The subambient pressure feature is located along the tape path and is adapted to induce frictional engagement between the tape and at least a portion of the tape-receiving surface at speeds of not less than 1 meter/second to suppress lateral tape motion.

12 Claims, 4 Drawing Sheets

DATA STORAGE TAPE CARTRIDGE WITH SUBAMBIENT PRESSURE FEATURE

CROSS-REFERENCE TO RELATED APPLICATIONS

This application is related to, and incorporates by reference an entirety of, U.S. patent application Ser. No. 10/452,465, entitled "Magnetic Tape Head Assembly With Laterally Moveable Central Section," filed on even date herewith.

BACKGROUND OF THE INVENTION

The present invention relates to guiding of storage tape in a tape transport system. More particularly, it relates to a subambient pressure feature for attenuating high frequency lateral tape motion at high tape speeds within a tape transport system, for example, a data storage tape cartridge and/or a tape drive.

Data storage tape cartridges have been used for decades in the computer, audio, and video fields. The data storage tape cartridge continues to be an extremely popular form of recording large volumes of information for subsequent retrieval and use.

One type of data storage tape cartridge consists generally of an outer shell or housing maintaining two tape reels, two or more corner guides, and a length of magnetic storage tape. The storage tape is wrapped about and extends between the two tape reels along a tape path defined, in part, by the corner guides. In this regard, the corner guides extend the tape across a head access window (or read/write zone) formed in the housing. In particular, the corner guides are positioned at opposite sides of the head access window to direct the tape path therethrough. These two corner guides are typically "compliant guides," each providing an arcuate guide surface and opposing tape edge (or lateral) stop surfaces, one of which is compliant. Other guides may be provided within the housing to direct the storage tape between the tape reels and the corner guides associated with the head access window. Regardless, a door is normally associated with the head access window to provide selective access to the storage tape. During use, the cartridge is inserted into a tape drive, and the door is maneuvered into an open position. A transducer, such as a magnetic read/write head, interfaces with the storage tape via the head access window. To ensure consistent, accurate engagement by the read/write head, the storage tape must be precisely positioned within the head access window. Similar concerns can arise with a single reel cartridge configuration where the storage tape is driven between the cartridge reel and a take-up reel within the tape drive.

Various inherent design issues may compromise desired, precise positioning of the storage across the read/write head. For example, the tape reel(s) may contribute to unexpected lateral (or edge-to-edge) tape movement. In this regard, the typical tape reel includes a central hub and opposing flanges. The storage tape is wrapped about the central hub and is laterally constrained by the flanges (i.e., the flanges limit lateral movement of the storage tape by contacting a respective top or bottom edge). However, so as to not overly contact the tape edges, a slight tape edge-to-flange spacing is normally presented. That is to say, an overall lateral spacing between the opposing flanges is greater than a height of the storage tape, typically by 0.002–0.02 inch. As a result, during tape reel rotation, the storage tape may move laterally from flange-to-flange. This is especially true during data transfer operations in which the outer-most layers of the storage tape are normally not tightly wrapped about the tape reel hub. In other words, a "slack" is developed in the storage tape, such that the storage tape easily moves laterally between the opposing flanges. This unforeseen lateral movement is "seen" by the head, leading to read/write errors.

The corner guides cannot readily correct this unexpected lateral movement in that the guide surfaces associated with the corner guides are configured so as to not frictionally engage the storage tape at relatively high tape speeds, such as those encountered in the data transfer mode of operation. This is especially true with large diameter corner guides. At tape speeds in excess of 1 meter/second, an air bearing is generated between the guide surface and the storage tape such that the storage tape "flies" over the guide surface or otherwise experiences hydrodynamic lift. Thus, the guide surface does not and cannot frictionally dampen lateral tape movement. As previously described, compliant tape guides typically incorporate opposing, transverse flange surfaces that present "hard stops" to lateral tape movement. These transverse surfaces effectively angularly redirect lateral movements in the storage tape. In other words, a storage tape that has moved laterally along a tape reel will deflect at the associated compliant guide transverse surface, rendering the storage tape skewed or off-center with respect to the head. An additional concern is edge wear on the tape due to contact with guide flanges, including potential buckling of the tape edge.

Any slight deviation (or skew) from a desired planar positioning of a storage tape within the head access window may result in reading/writing errors. If the storage tape is slightly above or below an expected location, the read/write head will experience difficulties in finding a desired track on the storage tape. Additionally, with closed loop servo control systems, the read/write head may encounter tracking problems, whereby the head "loses" a desired track (commonly referred to as "servo off track event"). Importantly, with recent improvements in storage tape media that have increased available track densities, the likelihood of lateral movement-caused errors has similarly increased.

Magnetic tape systems continue to be highly popular. While the evolution of cartridge components, including the storage tape and compliant guides, has greatly improved storage capacity and cartridge performance, other problems, including lateral tape movement, remain. Therefore, a need exists for a tape transport system configuration adapted to dampen lateral storage tape movement during use, particularly at high tape speeds, such as within a data storage tape cartridge and/or a tape drive.

SUMMARY OF THE INVENTION

One aspect of the present invention relates to a data storage tape cartridge including a housing, first and second tape reels, a tape guide, a storage tape, and a subambient pressure feature. The housing defines a head access window. The first and second tape reels are rotatably disposed within the housing. The tape guide includes a curved tape-receiving surface defined by an entrance side and an exit side. In this regard, the tape guide is positioned within the housing such that the exit side is adjacent the window. The storage tape is wound about and extends between the tape reels along a tape path defined in part by the tape-receiving surface that otherwise guides the tape across the head access window. Finally, the subambient pressure feature is located along the tape path and is adapted to induce frictional engagement between the tape and at least a portion of the tape-receiving surface at speeds of not less than 1 meter/second. With this configuration, the induced frictional engagement between the tape and the tape-receiving surface suppresses high frequency lateral tape motion at speeds in excess of 1 meter/second, thereby greatly reducing servo off track events. In one preferred embodiment, the subambient pressure feature includes a pin positioned along the tape path between the first tape reel and the tape guide, establishing an overwrap angle between the tape and the entrance side of the tape-receiving surface. In another preferred embodiment, the subambient pressure feature includes a radial edge projection formed along the tape-receiving surface, the edge adapted to frictionally contact the storage tape.

Another aspect of the present invention relates to a method of moving storage tape within a tape transport system. The tape transport system includes a storage tape extending between two tape reels along a tape path defined, in part, by a tape guide having a tape-receiving surface. With this in mind, the method includes rotating the tape reels to establish a tape speed of not less than 1 meter/second. A subambient pressure is created between the storage tape and at least a portion of the tape-receiving surface to suppress high frequency lateral tape motion. In one preferred embodiment, the tape is forced into a longitudinal slot formed along the tape-receiving surface to provide further resistance to lateral motion. In another preferred embodiment, the method is effected within a data storage tape cartridge and/or a tape drive.

DETAILED DESCRIPTION OF THE PREFERRED EMBODIMENTS

Figure 1:
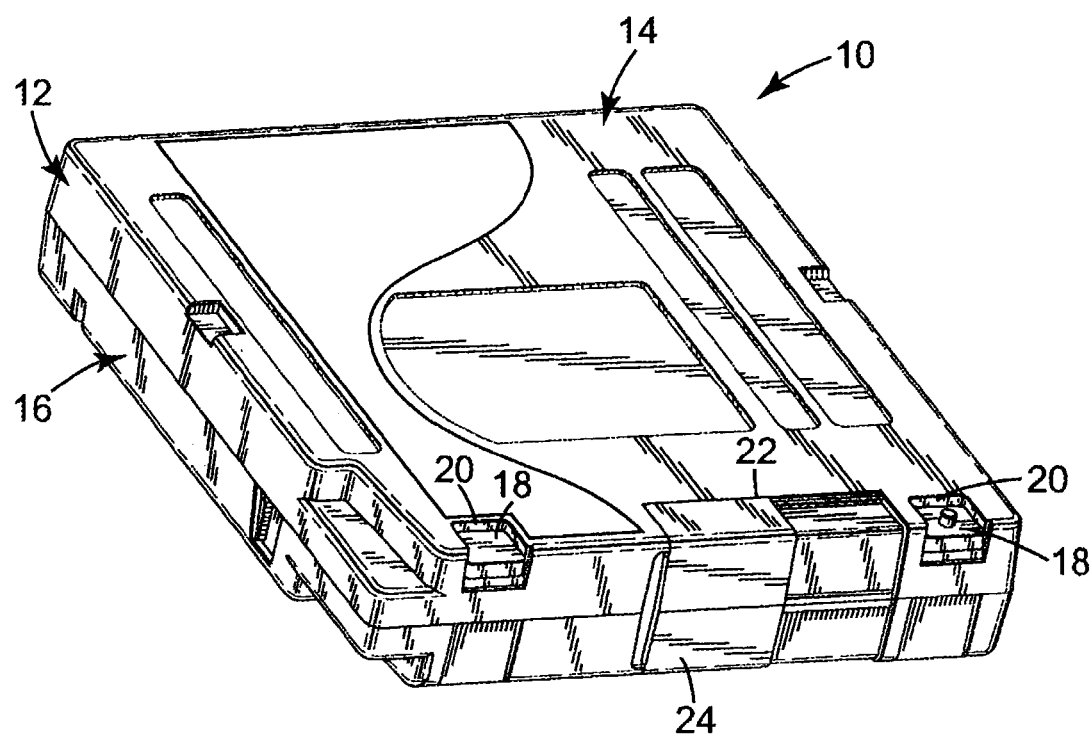
FIG. 1 is a perspective view of a data storage tape cartridge in accordance with the present invention.

One preferred embodiment of a data storage tape cartridge 10 is shown in FIG. 1. Generally speaking, the data storage tape cartridge 10 includes a housing 12 defined by a first housing section 14 and a second housing section 16. The cartridge 10 further includes a base plate 18, a portion of which is exposed through recesses 20 in the first housing section 14. Remaining components of the data storage tape cartridge 10 are described in greater detail below. However, with reference to FIG. 1, it should be understood that the first and second housing sections 14, 16 are reciprocally mated to one another and form an enclosure within which the various other components, including the base plate 18, are maintained.

The housing 12 is preferably sized to be received by a typical tape drive (not shown). Thus, the housing 12 may be sized for use within a 5.25-inch (130 mm) form factor drive, a 3.5-inch (90 mm) form factor drive, or other useful sizes. Further, the first and second housing sections 14, 16 combine to define a head access window 22 through which storage tape (not shown), otherwise maintained within the housing 12, can be accessed by a read/write head (not shown). To this end, the data storage tape cartridge 10 includes a door 24. The door 24 is preferably slidably secured to the housing 12 such that the door 24 can be selectively moved to provide access to the window 22.

In a preferred embodiment, the first housing section 14 is a cover, whereas the second housing section 16 is a base. With reference to the orientation shown in FIG. 1, the data storage tape cartridge 10 is normally inserted into a tape drive (not shown) with the cover 14 facing upward. It should be recognized, however, that the data storage tape cartridge 10 can be oriented to any position. Further, the design of the data storage tape cartridge 10 can be such that the first housing section 14 forms a base, whereas the second housing section 16 is a cover.

Figure 2:
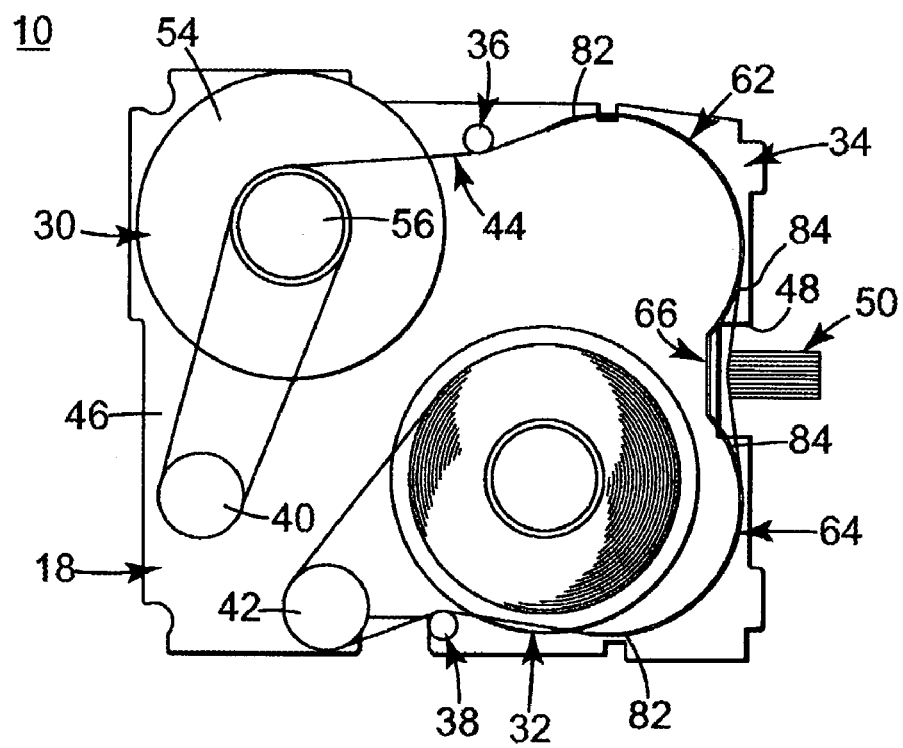
FIG. 2 is a top view of the data storage tape cartridge of FIG. 1 with a portion of the housing removed illustrating one embodiment of a negative gauge pressure feature in accordance with the present invention.

The internal components of one preferred embodiment of the data storage tape cartridge 10 are shown in FIG. 2. Notably, for ease of illustration, the first and second housing sections 14, 16 are removed from the view of FIG. 2. The data storage tape cartridge 10 preferably includes the base plate 18, a first tape reel 30, a second tape reel 32, a tape guide 34, a first subambient pressure feature 36, a second subambient pressure feature 38, a first idler bearing 40, a second idler bearing 42, and a storage tape 44. As described in greater detail below, the first and second tape reels 30, 32 are rotatably secured about respective hub pins (not shown) extending from an interior surface 46 of the base plate 18. The tape guide 34, the first and second subambient pressure features 36, 38, and the idler bearings 40, 42 are similarly secured to the interior surface 46 of the base plate 18.

In a preferred embodiment, the base plate 18 is made of a rigid material, such as aluminum. The base plate 18 is sized to nest within the first housing section 14 (FIG. 1), and defines a head access recess 48, corresponding with the head access window 22 (FIG. 1), where the storage tape 44 is engaged with a transducer or read/write head 50.

The tape reels 30, 32 are virtually identical and are positioned to rotate relative to the base plate 18 about respective hub pins (not shown) as is known in the art. Each of the first and second tape reels 30, 32 includes opposing flanges 54 (one of which is shown in FIG. 2) and a central hub 56. The opposing flanges 54 are spaced along the hub 56 in accordance with a width of the storage tape 44. The storage tape 44 wraps around an outer circumference of the hub 56, laterally constrained by the opposing flanges 54.

The tape guide 34 is preferably an elongated tape guide secured to the base plate 18 by any select one of a number of known fasteners. For example, as and with additional reference to FIG. 3, integral mounting pegs 60 may be mounted in apertures (hidden in FIG. 2) in the base plate 18 and securely held in place at the desired locations. Alternatively, the tape guide 34 may be mounted to the base plate 18 by any suitable method such as, for example, ultrasonic welding, resistance welding, staking, etc.

Figure 3:
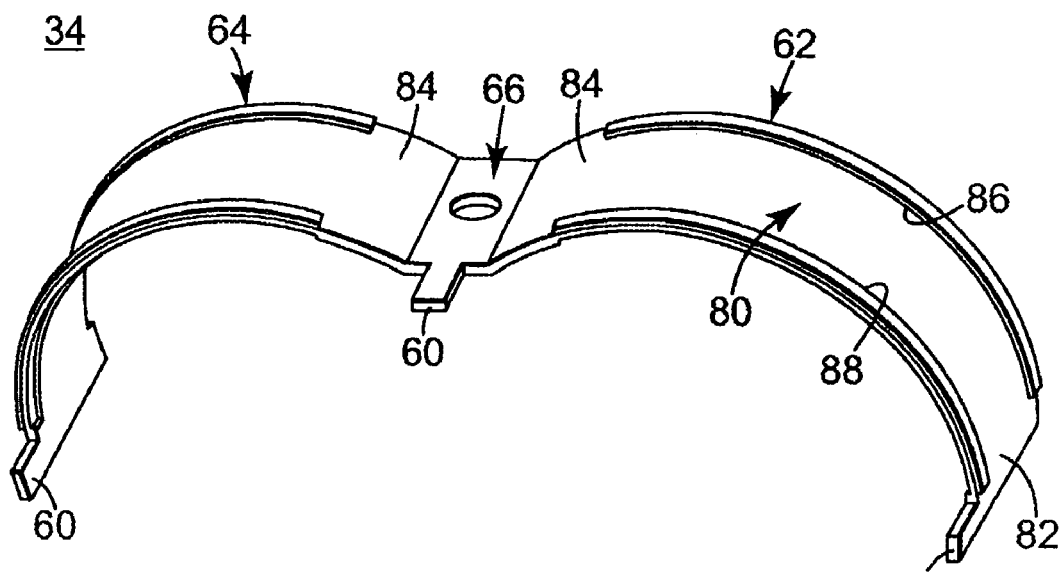
FIG. 3 is an enlarged, perspective view of a tape guide portion of the data storage tape cartridge of FIG. 2.

With continued reference to FIGS. 2 and 3, the tape guide 34 is formed to define opposing corner guide portions 62, 64, and a central portion 66. The central portion 66 is sized to provide clearance about necessary components of the cartridge 10 and the desired tape path across the head access recess 44 (and thus the read/write head 50).

Each of the corner guide portions 62 provide a curved tape-receiving or bearing surface 80 that is generally perpendicular to the base plate 18 when installed. Each of the tape-receiving surfaces 80 is defined by an entrance side 82 and an exit side 84. As best shown in FIG. 2, upon final assembly, the corner guide portions 62, 64 are positioned at opposite sides of the head access recess 48 (and thus the head access window 22 (FIG. 1)), with the exit side 84 of each tape-receiving surface 80 being positioned adjacent the head access recess 44. In a preferred embodiment, the corner guide portions 62, 64 can further include upper and lower formed flanges 86, 88 defining support shoulders to position upper and lower edges of the storage tape 44.

The tape-receiving surfaces 80 define a radius of curvature selected to guide the storage tape 44 across the head access window 22 (FIG. 1). In a preferred embodiment, the corner guide portions 62, 64 define large diameters as described, for example, in U.S. Pat. No. 6,343,757, the teachings of which are incorporated herein by reference. Regardless, a tape path is defined whereby the storage tape 44 extends from the first tape reel 30, to the corner guide portion 62, across the head access window 22, to the corner guide portion 64, and finally to the second tape reel 32. As is known in the art, the idler bearings 40, 42 are preferably provided to further define the tape path as the storage tape 44 extends from the first and second tape reels 30, 32, respectively. As described in greater detail below, this generally known tape path is altered by the subambient features 36, 38.

While the corner guide portions 62, 64 have been described as preferably being provided by the single tape guide 34, alternative configurations are equally acceptable. For example, the corner guide portions 62, 64 can be separate corner guide components, such as compliant guides known in the art. Regardless, with the one embodiment of FIG. 2, the first and second subambient features 36, 38 dictate a preferred tape path in which the storage tape 44 frictionally engages the tape-receiving surfaces 80 of the corner guide portions 62, 64, respectively, at high tape speeds (i.e., not less than 1 meter/second) when the tape 44 is moved in an appropriate direction (i.e., clockwise for the first corner guide portion 62 relative to the orientation of FIG. 2, and counter-clockwise relative to the second corner guide portion 64). In particular, the first and second subambient pressure features 36, 38 provided with the embodiment of FIG. 2 are pins located along the tape path, positioned to generate an overwrap angle between the storage tape 44 and the tape-receiving surfaces 80 at their respective entrance sides 82. For example, the first pin 36 establishes an overwrap angle between the storage tape 44 and the first corner guide portion 62 at the entrance side 82 thereof; whereas the second pin 38 establishes an overwrap angle between the storage tape 44 and the tape-receiving surface 80 of the second corner guide portion 64 at the entrance side 82 thereof.

But for the first and second pins 36, 38, the storage tape 44 would experience hydrodynamic lift relative to the tape-receiving surface 80 at tape speeds of at least 1 meter/second, especially with the preferred large diameter corner guide portions 62, 64. The first and second subambient pressure features 36, 38 alter the tape path, causing the storage tape 44 to contact the entrance side 82 of the respective tape-receiving surface 80, preferably at an overwrap angle of at least approximately 3°, more preferably 3°–5°. Depending upon the direction of tape movement, this interface essentially "scrapes" air from a back side of the storage tape 44, such that the storage tape 44 remains in frictional contact with the corresponding tape-receiving surface 80, thereby suppressing high frequency lateral tape motion.

For example, with respect to the orientation of FIG. 2, when the tape 44 is moved in a clockwise direction, the first subambient pressure feature 36 directs the storage tape 44 into contact with the entrance side 82 of the tape-receiving surface 80 of the first corner guide portion 62. This controlled drag interface minimizes the opportunity for hydrodynamic lift of the storage tape 44 relative to the first guide portion 62, and thus minimizes lateral tape motion. Conversely, when the storage tape 44 is moved in a counter-clockwise direction, the second subambient pressure feature 38 directs the storage tape 44 into contact with the entrance side 82 of the tape-receiving surface 80 of the second corner guide portion 64. Once again, this interface creates frictional drag, thereby minimizing hydrodynamic lift of the storage tape 44 relative to the second corner guide portion 64.

Figure 4A:
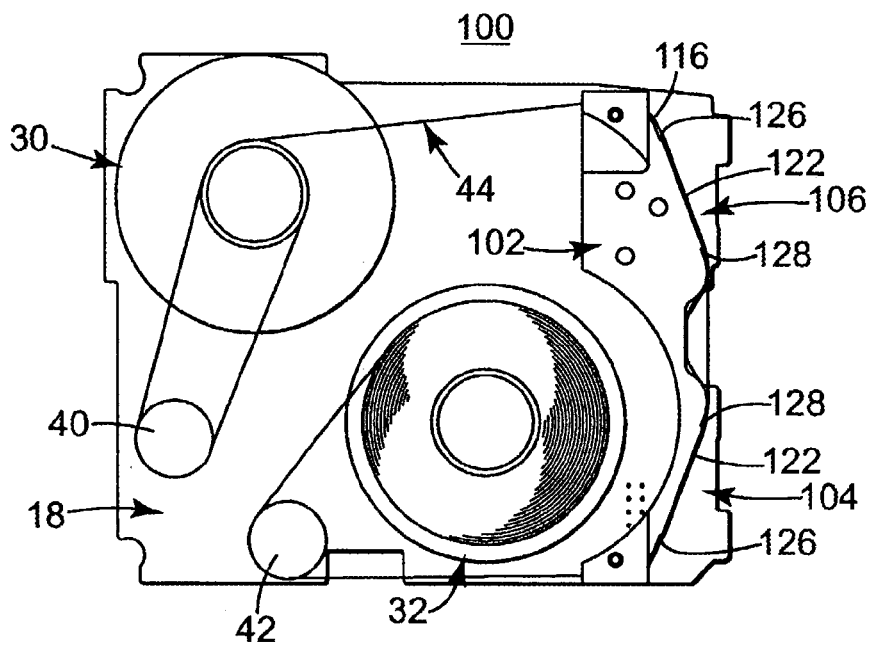
FIG. 4A is a top view of a data storage tape cartridge with a portion removed and illustrating an alternative embodiment negative gauge pressure feature in accordance with the present invention.

While the embodiment of FIG. 2 has been preferably described as providing two of the subambient pressure features 36, 38, in an alternative embodiment, only one need be provided. In addition, the present invention encompasses varying subambient pressure feature designs. For example, FIG. 4A illustrates a portion of an alternative embodiment data storage tape cartridge 100 including several of the components provided with the data storage tape cartridge 10 previously described. In particular, the data storage tape cartridge 100 preferably includes the base plate 18, the first and second tape reels 30, 32, the idler bearings 40, 42, and the storage tape 44. In addition, the data storage tape cartridge 100 preferably includes a tape guide 102 providing first and second subambient pressure features 104, 106 (referenced generally in FIG. 4A), as described in greater detail below in conjunction with FIGS. 4B and 4C. As with the previous embodiment, the tape guide 102 is preferably an elongated tape guide, providing first and second corner guide portions 108, 110. Alternatively, the corner guide portions 108, 110 can be provided as separate components. Regardless, the first subambient pressure feature 104 is formed in the first corner guide portion 108, whereas the second subambient pressure feature 106 is provided with the second corner guide portion 110.

Figure 4B:
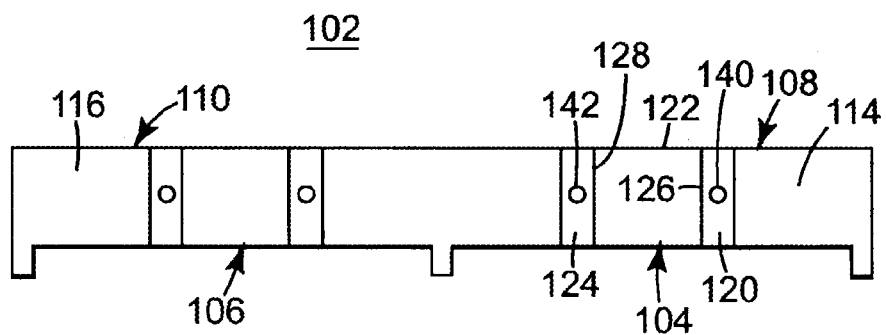
FIG. 4B is a front view of a tape guide portion of the data storage tape cartridge of FIG. 4A in flat form before forming.

FIG. 4B shows one embodiment of the tape guide 102 as a flat sheet before a forming process, it being understood that once formed, the corner guide portions 108, 110 will be curved, similar to the tape guide 34 of FIG. 3. In particular, each of the corner guide portions 108, 110 define a curved tape-receiving surface 114, 116, respectively, having a radius of curvature. The subambient pressure features 104, 106 represent a deviation from this defined radius of curvature. More particularly, each of the subambient pressure features 104, 106 provide at least one relatively square corner or edge along the corresponding tape-receiving surface 114, 116.

Figure 4C:
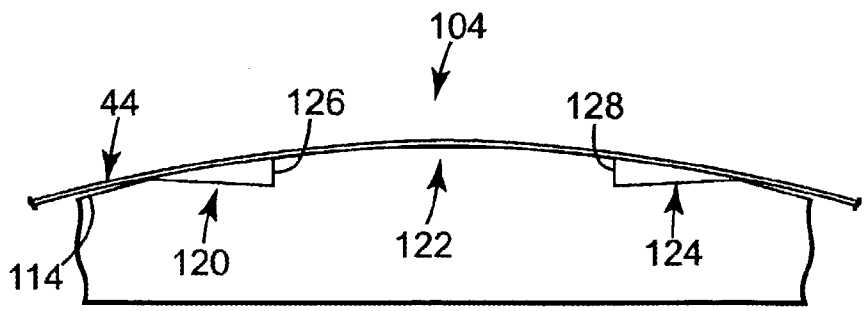
FIG. 4C is an enlarged view of a portion of the tape guide of FIG. 4B.

For example, the first subambient pressure feature 104, in combination with the storage tape 44, is shown in greater detail in FIG. 4C, and is defined by a leading section 120, a central section 122, and a trailing section 124. Relative to the radius of curvature defined by the tape-receiving surface 114, the leading and trailing sections 120, 124 are radially inward extensions (or smaller radius). The central section 122 projects radially outwardly relative to the leading and trailing sections 120, 124, defining edges 126, 128. The central section 122 can have a radius of curvature identical to that of the remainder of the tape-receiving surface 114, or can project beyond this curvature (e.g., define a larger radius). Regardless, the edges 126, 128 provide distinct contact surfaces for frictionally engaging the storage tape 44 during movement thereof, especially at high tape speeds of at least 1 meter/second. In particular, the subambient pressure feature 104 is configured to generate an approach angle (or overwrapping) of at least 3°, more preferably 3°–5°, between the storage tape 44 and the respective edges 126 or 128.

Relative to the orientation of FIG. 4A and with continued reference to FIG. 4C, when the storage tape 44 is moved in a clockwise direction, the storage tape 44 will interface with the edge 126 at the defined approach or overwrap angle, such that the edge 126 removes or "scrapes" air from a back side of the storage tape 44. This, in turn, causes the storage tape 44 to frictionally contact the tape-receiving surface 114, thereby limiting lateral tape movement. Conversely, when the storage tape 44 is moved in a counter-clockwise direction, the edge 128 interfaces with the storage tape 44, providing the same frictional drag described above. The second subambient pressure feature 106 provided with the second corner guide portion 110 is preferably identically configured. To this end, while the first and second subambient pressure features 104, 106 have been preferably described as each providing two edges 126, 128, only one such edge need be provided. Further, the data storage tape cartridge 100 can be configured such that only a single one of the subambient pressure features 104 or 106 is employed.

In one preferred embodiment, the present invention provides one or more vent holes 140, 142 in conjunction with the subambient pressure features 104, 106, as best shown in FIG. 4B. The vent holes 140, 142 are preferably formed within the leading and trailing sections 120, 124, respectively, and provide a path or exit for air removed from the backside of the storage tape 44 as previously described. For example, with respect to the orientation of FIG. 4A and with continued reference to FIG. 4B, as the storage tape 44 is moved in a clockwise direction, the edge 126 removes air from the backside of the storage tape 44. The vent hole 140 provides an exit for this removed air. Conversely, the vent hole 142 allows for airflow to be added back into the tape path, thereby improving the desired negative gauge pressure condition between the storage tape 44 and the tape-receiving surface 114.

Figure 5A:
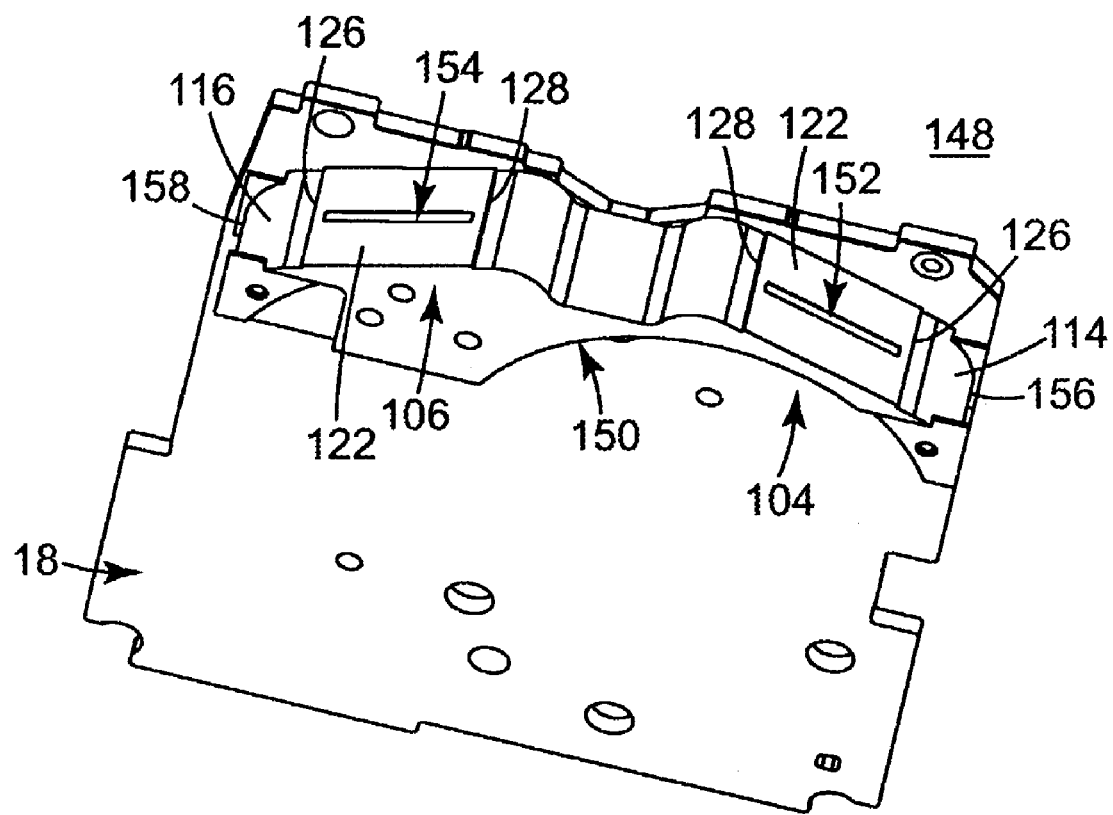
FIG. 5A is a front perspective view of a portion of a data storage tape cartridge including an alternative embodiment tape guide.

In one preferred embodiment, the present invention further includes a longitudinal slot or groove in combination with the subambient pressure feature that further suppresses high frequency lateral tape motion. For example, FIG. 5A illustrates a portion of an alternative embodiment data storage tape cartridge 148 including the base plate 18 and a tape guide 150. The tape guide 150 highly similar to the tape guide 102 previously described with respect to FIGS. 4A–4C, and includes first and second subambient pressure features 104, 106 formed in the first and second corner guide portions 108, 110, respectively, that otherwise define the corresponding tape-receiving surfaces 114, 116. In addition to the first and second subambient pressure features 104, 106, the tape guide 150 forms a longitudinal locking slot 152, 154 along the central section 122 of the respective subambient pressure features 104, 106. The slots 152, 154 are preferably centered relative to the corresponding tape-receiving surface 114, 116, and have a height (measured in a direction perpendicular to tape travel) less than a height of the corner guide portions 108, 110 and the storage tape 44 (FIG. 2); more preferably less than one-half a height of the corner guide portions 108, 100 and the storage tape 44; even more preferably less than one-third. Further, while the slots 152, 154 are depicted in FIG. 5A as having a longitudinal length less than that of the corresponding central section 122, other lengths are equally acceptable (e.g., extending an entire length of the central section 122). Notably, with the embodiment of FIG. 2 including subambient pressure features in the form of pins 36, 38, the longitudinal locking slots 152, 154 of FIG. 5A can be employed, but are preferably located at or adjacent an entrance side 156, 158, of the corresponding tape-receiving surface 114, 116.

Figure 5B:
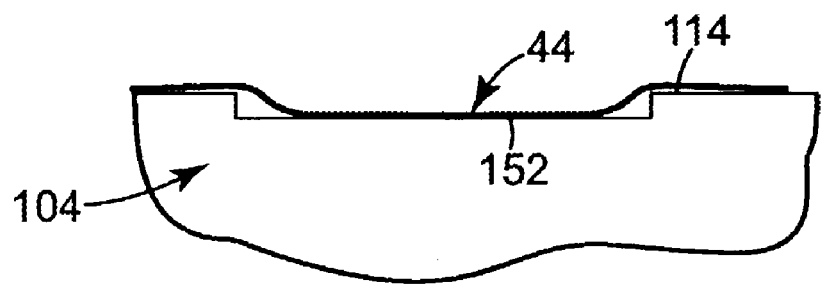
FIG. 5B is an enlarged view of a portion of the tape guide of FIG. 5A in conjunction with a storage tape.

Regardless of length and location, the subambient pressure condition along at least a portion of the tape-receiving surface 114 forces the storage tape 44 into the longitudinal locking slot 152 as shown in FIG. 5B (it being understood that a similar interface with the storage tape 44 is presented with the longitudinal slot 154). Upon being forced into the longitudinal slot 152, further resistance to lateral tape movement is achieved, without the need to constrain an edge of the tape 44. This, in turn, avoids the potential problems associated with the edge wear, including potential buckling of the tape edge. In a preferred embodiment, the longitudinal slots 152, 154 are formed in areas of the tape-receiving surface 114, 116 that does not otherwise have longitudinal curvature. This allows the storage tape 44 to have curvature in only one dimension rather than two. In an alternative embodiment, two or more of the longitudinal locking slots 152 or 154 are formed in one or both of the subambient pressure features 104 or 106.

The tape transport system of the present invention provides a marked improvement over previous designs. In particular, by providing one or more subambient pressure features, undesirable lateral tape motion is greatly attenuated, for example within a data storage tape cartridge and/or a tape drive. In preferred embodiments, locking slots and/or vent holes are further employed to optimize tape guiding performance.

Although the present invention has been described with respect to preferred embodiments, workers skilled in the art will recognize that changes can be made in form and detail without departing from the spirit and scope of the present invention. For example, while the subambient pressure feature has been described with reference to a dual reel data storage tape cartridge, it is equally applicable to other tape transport system applications. For example, the subambient pressure feature of the present invention can be incorporated within a tape drive otherwise adapted for use with a single reel data storage tape cartridge. With this application, upon insertion of the tape cartridge into the tape drive, the storage tape is extended between the cartridge reel and a take-up reel provided by the tape drive. The tape drive includes at least one tape guide that defines at least a portion of a tape path along a read/write head (with the tape guide being a component separate from the read/write head). The subambient pressure feature of the present invention is associated with the drive's tape guide to control lateral movement of the storage tape as previously described.

What is claimed is:

1. A data storage tape cartridge comprising:
   a housing forming a head access window;
   first and second tape reels rotatably maintained within the housing;
   a tape guide including a first curved tape-receiving surface defined by an entrance side and an exit side, the tape guide positioned within the housing such that the exit side is adjacent the window;

a storage tape wound about and extending between the tape reels along a tape path defined in part by the tape-receiving surface; and a subambient pressure feature located along the tape path and adapted to induce frictional engagement between the storage tape and at least a portion of the tape-receiving surface at tape speeds of not less than 1 meter/second, wherein the subambient pressure feature includes a pin positioned along the tape path between a first one of the tape reels and the tape guide, the pin establishing an overwrap angle between the storage tape and the entrance side of the tape-receiving surface, a second curved tape-receiving surface positioned adjacent the head access window, opposite the first tape receiving surface; and a second pin positioned along the tape path between the second tape-receiving surface and the second tape reel to induce frictional engagement between the storage tape and at least a portion of the second tape-receiving surface at tape speeds of not less than 1 meter/second.

2. The data storage tape cartridge of claim 1, wherein the overwrap angle is at least 3°.

3. The data storage tape cartridge of claim 1, wherein the first tape-receiving surface defines a primary radius of curvature, and further wherein the subambient pressure feature includes a radial edge projection formed along die tape-receiving surface.

4. The data storage tape cartridge of claim 3, wherein the subambient pressure feature includes a leading section, a trailing section, and a central section, and further wherein the leading section is most adjacent the entrance side and defines a radius less than the primary radius of curvature, and further wherein the central section defines the edge projection.

5. The data storage tape cartridge of claim 4, wherein the edge projection is adapted to frictionally engage the tape as the tape moves across the tape guide from the entrance side to the exit side.

6. The data storage tape cartridge of claim 5, wherein the edge projection is adapted to establish an overwrap angle between the tape and the entrance side of the tape-receiving surface.

7. The data storage tape cartridge of claim 5, wherein the trailing section is most adjacent the head access window and defines a radius less than the primary radius of curvature such that the central section defines a second edge projection relative to the trailing section.

8. The data storage tape cartridge of claim 4, further comprising a first vent hole extending from the tape-receiving surface to a back face of the tape guide, the fist vent hole formed within the leading section of the subambient pressure feature.

9. The data storage tape cartridge of claim 8, further comprising a second vent hole formed within the trailing section of the subambient pressure feature.

10. The data storage tape cartridge of claim 3, further comprising:

a second curved tape-receiving surface positioned adjacent the lead access window opposite the first tape-receiving surface and defining a primary radius of curvature; and a second radial edge projection formed along the second tape-receiving surface and adapted to frictionally engage the storage tape.

11. The data storage tape cartridge of claim 10, wherein the first and second tape-receiving surfaces are formed by a single tape guide.

12. The data storage tape cartridge of claim 1, further comprising a longitudinal slot formed within the tape-receiving surface for laterally constraining the tape as the tape moves across the tape-receiving surface, wherein the subambient pressure feature is defined along the tape-receiving surface, and includes a central section extending between two edges, and further wherein the longitudinal slot is formed along the central section.

\* \* \* \* \*

UNITED STATES PATENT AND TRADEMARK OFFICE
CERTIFICATE OF CORRECTION

PATENT NO. : 6,874,720 B2
APPLICATION NO. : 10/452334
DATED : April 5, 2005
INVENTOR(S) : Zwettler et al.

It is certified that error appears in the above-identified patent and that said Letters Patent is hereby corrected as shown below:

Column 10,
   Line 12, "fist" should read --first--.
   Line 21, "lead" should read --head--.

Signed and Sealed this

Twenty-fifth Day of July, 2006

JON W. DUDAS
*Director of the United States Patent and Trademark Office*